Aug. 28, 1928.
G. D. JONES
1,682,228
TRACTOR PROPELLED IMPLEMENT
Original Filed March 8, 1922
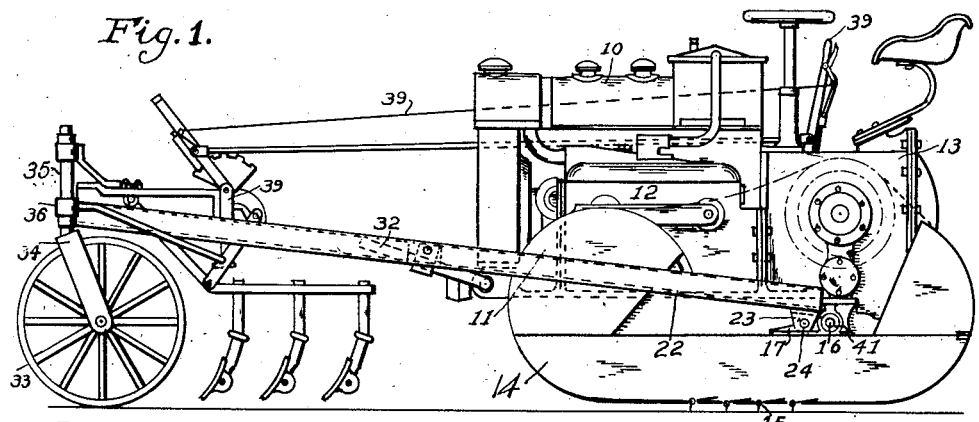
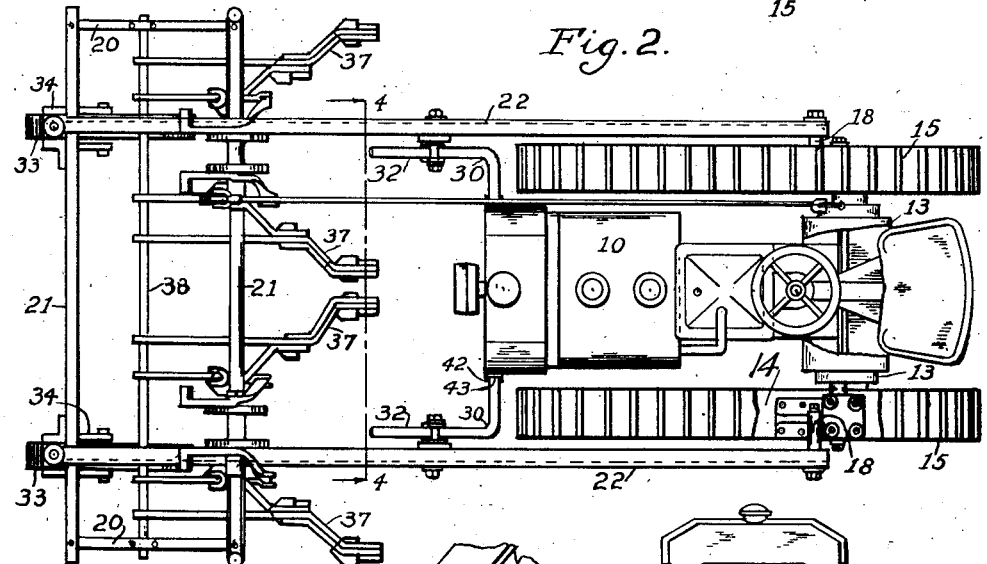
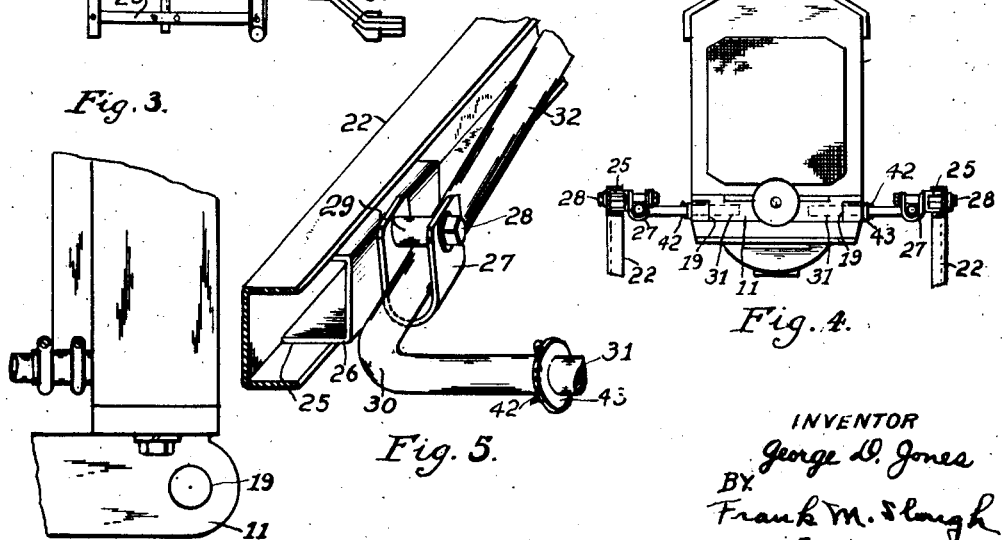
INVENTOR
George D. Jones
BY
Frank M. Slough
ATTORNEY.

Patented Aug. 28, 1928.

1,682,228

UNITED STATES PATENT OFFICE.

GEORGE DOUGLAS JONES, OF SACRAMENTO, CALIFORNIA, ASSIGNOR TO THE CLEVELAND TRACTOR COMPANY, OF CLEVELAND, OHIO, A CORPORATION OF OHIO.

TRACTOR-PROPELLED IMPLEMENT.

Continuation of application Serial No. 542,107, filed March 8, 1922. This application filed April 27, 1927. Serial No. 189,464.

This invention relates to the cooperative relation of a ground working implement with a tractor, and more particularly to the manner in which they are connected together.

An object of this invention is to provide a cooperative connecting mechanism for an implement carrying frame disposed in advance of the tractor, the connecting mechanism being so disposed as enjoined to the tractor and to the implement frame; relative independent vertical movement, of the implement and tractor and at the same time to restrain relative lateral movements thereof.

Another object of my invention is to accomplish the bracing of connecting means extending between a tractor and an implement disposed in advance of the tractor and pushed by the tractor through the said connecting means at all times in all relative vertical positions of the implement whereby the tractor and implement will be restrained from relative lateral movements.

Another object is to pivotally connect the frame of a pushed implement to a tractor, and to also provide a pivotal connection forward of the first mentioned connection, both of said connections serving to prevent any relative lateral movement between the implement frame and the tractor.

With these and other objects in view, the invention consists also of certain combinations and arrangements of parts, and in the details of construction hereinafter fully described and claimed, and illustrated in the accompanying drawings in which:—

Figure 1 is a side elevation of the implement and tractor connected together.

Figure 2 is a plan view of the same.

Figure 3 is a fragmentary view of the front end of the tractor showing the bearing therein for the link rod.

Figure 4 is a sectional view taken on line 4—4 of Figure 2, and,

Figure 5 is a detailed view of the connection between one of the link rods and the implement frame.

In carrying out the invention, broadly considered, almost any kind of tractor may be employed; but I prefer to use, and the drawings show, a tractor of the track laying type, in which there is a main motor supporting frame consisting of a gear cover casting 11, an engine casting 12 and a transmission casting 13 secured rigidly together in alignment as named. Reference may be had to the reissued patent to Rollin H. White, No. 14,938, dated August 24, 1920, as illustrating a tractor of this type, which may be employed in carrying out my invention. Such tractors of the track-laying type are steered by causing the two track belts to travel at the same or at different rates of speed or in different directions as may be required. An endless track structure is located on each side of the tractor frame and includes a frame 14 and a track 15. Each frame of the track structure has secured near its rear end a cast bracket 17, which is provided with bearings 41 and 18. An axle 16 is secured transversely of the transmission casting and the projecting ends thereof extend through the bearings 41 and are pivotally secured therewith. The front gear cover casting has an opening or bearing 19 in the forward end thereof, which extends transversely therethrough.

The carrying frame shown in the drawings supports gangs of cultivator hoes, but it is not the intention that the appended claims be limited to cultivators, as my invention applies to any device, supported by a carrying frame, which is propelled by a tractor.

The frame is constructed of longitudinally extended bars 20 and cross bars 21 which are rigidly connected together. Rigidly connected with and forming a part of this frame are two long rearwardly extended channel bars 22 which are spaced apart such a distance, that the tractor may go between them. To the rear ends of the said extended bars 22 are secured brackets 23 which are provided with bearings which are pivotally connected with the track frames by pins 24 extending therethrough and thru the bearing 18 in the cast bracket secured to the side frame. Suitable links referred to hereinafter are provided between the forward end of the tractor and the frame. It is to be understood that the beams 22 can be pivoted to the tractor at various other places and that I do not limit my invention in this respect to the location described.

The open sides of the channel bars 22 of the carrying frame face each other, and positioned therein and secured to each in advance of the tractor are bearing members 25, having a wall 26 extending outside of the channels. A U shaped stirrup 27 is pivotally secured adjacent each of the bearing members by bolts 28 which extend through the stirrup, the bearing member, and the channel beam. A hollow spacer 29 is positioned around each of the bolts within each stirrup. Two angular link rods 30 each have one end 31, extending into bearing 19 of the gear cover, which ends are free to hinge therein. The ends 31 of the link rods 30, each have a cotter pin 42 extending therethrough which acts as a stop for a washer 43 carried thereon, and by which means the rods are limited in the distance which they can be inserted in the bearing 19 of the gear cover casting. The other end 32 of the link rods extend forwardly and parallel with the rearwardly extending beams 22 of the supporting frame and project through the stirrup 27, under the spacer 29. This arrangement allows the ends 32 of the link rods to slide back and forth in the stirrups, which pivot relative to the beams 22. Thus it will be seen that the link rods pivot at one end and are slidable at the other end allowing relative vertical movement between the tractor and the supporting frame. This arrangement of the link rods with the tractor and supporting frame also reinforces the rearwardly extending beams 22 and prevents relative lateral movement between the tractor and the supporting frame.

The front end of the carrying frame is supported on two wheels 33 each of which is mounted in a fork 34 having a vertical stem 35 which is rotatably mounted in bearings 36 fixed respectively to the front end of the frame adjacent the corners thereof. Each of these pivotally connected forks is free to turn about the axis of the stem 35, and therefore the wheels have an independent castor like action, wherefore these frame supporting wheels will offer no material resistance to those lateral movements of the carrying frame which must take place when the tractor changes its direction of motion.

As before stated, the carrying frame for illustration supports gangs of cultivator hoes 37, and these gangs are pivotally carried by a transverse rotatable shaft 38, which is secured to the frame. A suitable train of mechanism 39 including rods, levers, etc., extends between the transverse shaft and the tractor, so that the driver can rock the shaft 38 to raise and lower the gangs of cultivator hoes.

To operate the combined machine, the rods 30 are inserted in their bearings in the front gear cover casting and the tractor is driven between the beams 22 of the frame, so that the forwardly extending ends of the rods project through and beyond the stirrups as described. The rear ends of the beams are raised up, the ends of the shaft 16 are secured in bearings 41, and the pins 24 are secured through the bearings in the brackets 23, and the bearings 18 on the side frames. Thus the tractor and supporting frame are pivoted together at their rear ends, and the forward end of the tractor is free to move independently vertically of the supporting frame. The stirrups being pivoted to the supporting frames and carrying the front ends of the rods 30 which are pivoted to the tractor, allow this relative vertical movement and at the same time the rods reinforce and steady the rearwardly extending beams 22, making a connection which assists in preventing relative movement between the tractor and the carrying frame.

In operating the described combined machine, the driver sitting on the tractor seat, controls the tractor in the usual way and steers it to the right or left as may be required to accurately guide it. The steering of the tractor causes a corresponding but somewhat greater like lateral movement of the implement while at the same time relative vertical movement is permitted.

This application is a continuation of my prior application Serial No. 542,107 filed March 8, 1922.

Having described my invention in a particular embodiment I am aware that numerous and extensive departures may be made from the embodiment disclosed but without departing from the spirit of my invention.

What I claim is:

1. In combination, a tractor, an implement carrying frame positioned in advance of said tractor, said frame having rearwardly extending beams pivoted to the rear end of said tractor, each of said beams being provided with a stirrup pivotally secured thereto, and links pivotally connected to said tractor and connected with the stirrups pivoted to the rearwardly extending beams of said implement frame.

2. In combination a tractor; an implement carrying frame positioned in advance of said tractor, said frame having rearwardly extending beams pivoted to said tractor near the rear end thereof; stirrups pivotally connected to said beams adjacent the front end of said tractor; and links pivotally connected transversely to the front end of said tractor and slidably mounted through said stirrups pivoted to said beams.

3. In combination a tractor having a transverse bearing in the forward end thereof; an implement frame located in advance of said tractor and having rearwardly extending beams pivoted to the rear end of said tractor; and an angle link at each side of said tractor, each of said links having an arm extending into and rotatably mounted in the transverse bearing in the front of said tractor and having the other arm extending parallel with and slidably connected to the rearwardly extending beams of said implement frame.

4. In a tractor mechanism comprising a pair of laterally disposed independently driven endless tracks for directively propelling the mechanism, an implement carrying frame positioned in advance of said tractor, a tilling implement swivelably supported by said frame, said frame having a pair of rearwardly extending beams extending each along a different side of the tractor and each pivoted near the rear end of the tractor, a pair of bracing arms each joining the forward part of the tractor with the adjacent portion of one of the laterally disposed beams, said bracing arms adapted to prevent lateral swinging movement of said beams independently of the tractor but adaptable to permit vertical rotative movements of the beams on their pivots.

5. The combination of a tractor, an implement, said implement having a frame including a pair of beams extending rearwardly on each side of said tractor substantially the length thereof and pivotally connected at their rear ends with the tractor, and a vertically swivelable means joining the tractor and said beams to prevent independent lateral movement of said implement frame relative to said tractor, and caster wheels carried by the front end of the implement frame for supporting the same.

6. In combination, a track-laying tractor having a pair of laterally disposed driving belts each of which may be individually operated to substantially pivot the tractor for steering purposes, of an implement disposed forwardly of the tractor, a pair of arms extending along the sides of the tractor and projected forwardly thereof, said implement being secured at its sides between the forward ends of the arms, said arms being pivotally connected to the tractor at a point toward the rear end thereof, a caster wheel for said implement and supporting the same, said caster wheel making engagement with the ground well in advance of the tractor tracks, and vertically swivelable connecting means disposed intermediate the implement and the arm pivots joining the arms intermediate their ends with a forward portion of the tractor and restraining relative lateral movements of the arms and tractor.

In testimony whereof I hereunto affix my signature this 17th day of November, 1926.

GEORGE DOUGLAS JONES.